United States Patent [19]

Lang et al.

[11] Patent Number: 4,693,352

[45] Date of Patent: Sep. 15, 1987

[54] CLUTCH MECHANISM

[75] Inventors: David J. Lang, Rockford; John C. Layer, Caledonia; William G. Durtschi, Rockford, all of Ill.

[73] Assignee: Sundstrand Corporation, Rockford, Ill.

[21] Appl. No.: 852,770

[22] Filed: Apr. 16, 1986

[51] Int. Cl.⁴ ............................................. F16D 13/50
[52] U.S. Cl. ............................ 192/70.27; 192/85 AA
[58] Field of Search ............ 192/85 AA, 85 A, 70.27, 192/70.28, 101, 109 B

[56] References Cited

U.S. PATENT DOCUMENTS

| | | | |
|---|---|---|---|
| 3,994,378 | 11/1976 | Schwäbe et al. | 192/85 AA X |
| 4,147,245 | 4/1979 | Folomin et al. | 192/85 AA |
| 4,378,061 | 3/1983 | Schierling et al. | 192/85 AA |
| 4,421,218 | 12/1983 | Haight | 192/85 AA X |
| 4,442,929 | 4/1984 | Uchida | 192/85 AA X |
| 4,520,912 | 6/1985 | Ferris et al. | 192/85 AA |

Primary Examiner—William F. Pate, III
Assistant Examiner—Creighton Smith
Attorney, Agent, or Firm—Wood, Dalton, Phillips, Mason & Rowe

[57] ABSTRACT

Thrust bearing failure in clutches is avoided in a clutch construction including a housing 10 with first and second coaxial shafts 24, 32 and a clutch pack 34 interconnecting the shafts 24 and 32 for coupling and decoupling the same. A spring 50 is utilized to engage the clutch pack 34 to couple the shafts 24 and 32 while a motor 82, 96 is utilized to decouple the shafts by releasing compression on the clutch pack 34. This is accomplished by moving a thrust bearing 76 to engage a reaction plate 48 forming part of the clutch pack 34 to move the same away from the other reaction plate 34 of the clutch pack to disengage the clutch. The thrust bearing 76 is wholly out of the load path of the clutch when the clutch is engaged.

9 Claims, 2 Drawing Figures

CLUTCH MECHANISM

FIELD OF THE INVENTION

This invention relates to a clutch mechanism, and more particularly, to a clutch mechanism wherein a thrust bearing is removed from the load path through the clutch whenever the clutch is engaged to thereby prolong the life of the thrust bearing and the clutch.

BACKGROUND OF THE INVENTION

Clutch mechanisms have long been used for alternatively coupling and decoupling a drive shaft to a driven shaft. In many cases the clutch mechanism includes friction plates, alternate ones of which are coupled to the drive shaft and to the driven shaft and which are axially compressed between reaction plates to engage the clutch. A conventional construction typically includes one or more thrust bearings associated with the reaction plates and through which a compressive force is applied to the reaction plates to engage the clutch. Consequently, the thrust bearings are part of the load path when the clutch is engaged and are subject to the same loading as the friction plates. This loading accelerates the rate of bearing failure and commensurately reduces the reliability of the clutch construction.

The present invention is directed to overcoming one or more of the above problems.

SUMMARY OF THE INVENTION

It is a principal object of the invention to provide a new and improved clutch construction. More specifically, it is an object of the invention to provide a clutch construction which does not rely on forces transmitted through a thrust bearing to compress a clutch pack to engage the clutch and which removes a thrust bearing employed in the clutch construction from the load path through the clutch whenever the clutch is engaged.

An exemplary embodiment of the invention achieves the foregoing object in a construction including a housing. First and second shafts are provided with the second shaft being coaxial with the first shaft and a clutch pack is included which comprises a plurality of relatively axially movable friction plates sandwiched by first and second reaction plates. At least one of the friction plates is sandwiched by two other friction plates and is mounted on one of the shafts for rotation therewith while the two other friction plates are mounted on the other of the shafts for rotation therewith. The reaction plates are associated with one of the shafts for rotation therewith and are axially movable relative to each other to compress and release the friction plates. Means are provided for biasing the reaction plates towards each other and a motor is included and is carried by the housing. A thrust bearing is movable by the motor between a first position non-engaged with the plates and a second position urging at least one of the reaction plates away from the other of the reaction plates.

As a consequence of this construction, the biasing means will cause engagement of the clutch whenever the motor is operated to move the thrust bearing to the first position. When the thrust bearing is in the second position, the reaction plates are urged away from one another to disengage the clutch. Conversely, when the thrust bearing is not engaged with the plates, the clutch is engaged but the thrust bearing is not within the clutch load path. Therefore, the high failure rate associated with thrust bearings in clutch load paths is avoided according to the invention.

An exemplary embodiment of the invention contemplates that the motor include a further spring and a piston operable to compress the further spring. The further spring is operable to move the thrust bearing toward the second position when not compressed by the piston.

A highly preferred embodiment contemplates that the shafts be in substantial end-to-end relation and that one of the shafts journal the end of the other. In a highly preferred embodiment, a journal bearing is carried in the end of the one of the shafts and a pin is carried by the other of the shafts and is journalled in the journal bearing.

The invention further contemplates that the thrust bearing comprise a ball or roller bearing having two axially spaced races. One of the races has an edge extending radially outwardly of the other of the races and the further spring applies the uring force to the one race. A cup shaped actuator is disposed within the housing about the clutch pack and is axially movable. The actuator engages the edge of the one race oppositely of the further spring and the piston is operable to shift the actuator to thereby shift the thrust bearing.

The housing mounts first and second journal bearings in proximity to the shafts with one of the journal bearings journalling the first shaft and the other of the journal bearings journalling one of the reaction plates, and specifically, the reaction plate most remote from the first shaft.

Other objects and advantages will become apparent from the following specification taken in connection with the accompanying drawings.

DESCRIPTION OF THE PREFERRED EMBODIMENT

Figure 1:
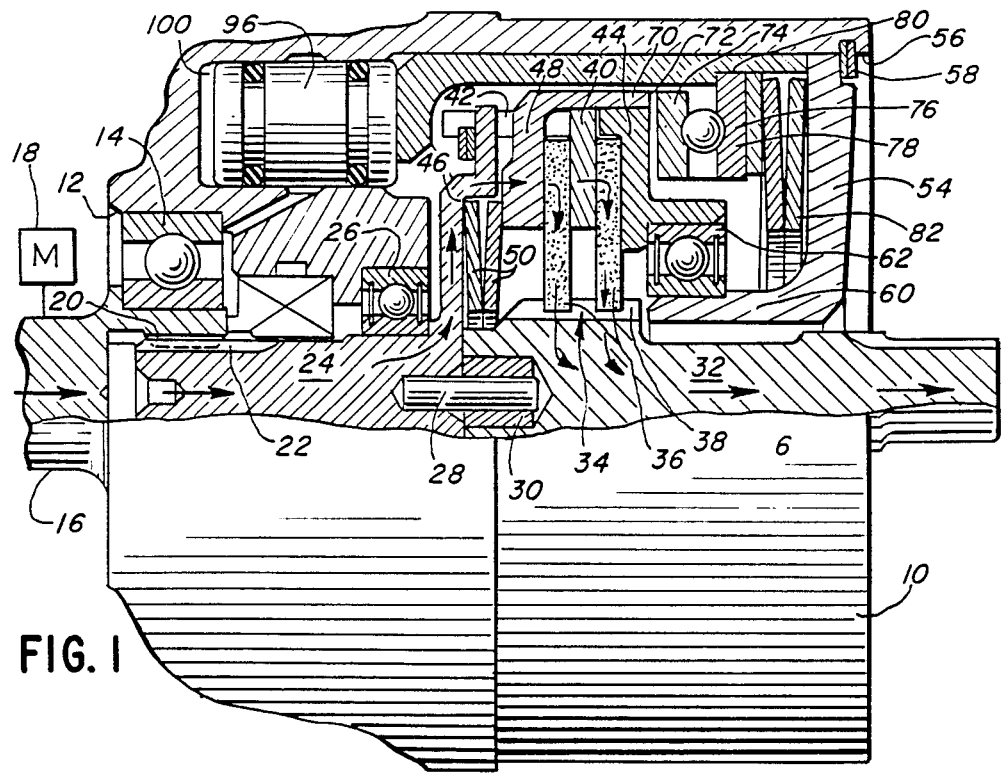
FIG. 1 a partial sectional view of a clutch construction made according to the invention and illustrating the relative position of the various component when the clutch is engaged.

An exemplary embodiment of a clutch made according to the invention is illustrated in the drawings and with reference thereto is seen to include a housing 10. One end of the housing 10 includes a central opening 12 which receives a journal bearing 14. The journal bearing 14 journals a drive shaft 16 which may be coupled to a prime mover or motor as schematically illustrated at 18.

The shaft 16 includes internally directed splines 20 in mesh with radially directed splines 22 on a clutch input shaft 24. A journal bearing 26 within the housing 10 journals the end of the shaft 24 remote from the shaft 16. Such end of the shaft 24 mounts a pin 28 which is received in a journal bearing 30 carried by the adjacent end of a coaxial output shaft 32.

Disposed about the shafts 24 and 32 is a clutch pack, generally designated 34. The clutch pack 34 includes two friction plates 36 which are splined to the output shaft as at 38. An intermediate friction plate 40 is sandwiched by the friction plates 36 and is splined to axially extending fingers 42 of a first reaction plate 44. The fingers 42 are axially slidable in grooves (not shown) in a radially directed web 46 on the end of the shaft 24. Thus, the friction plate 40 and the reaction plate 44 are coupled to the shaft 24 for rotation therewith while the friction plates 36 are coupled to the shaft 32 for rotation therewith.

As will be readily appreciated by those skilled in the art, where clutch capacity is to be increased, a greater number of the friction plates 36 and 40 can be employed.

The clutch pack 34 includes a second reaction plate 48 which is generally bell-shaped and slidable on the fingers 42 toward and away from the reaction plate 44. The reaction plates 44 and 48 sandwich the friction plates 36 and 40 and consequently, when the plates 44 and 48 are moved toward each other, they compress the plates 36 and 40 to engage the clutch.

To provide an engaging force, two Belleville springs 50 are disposed about the end of the shaft 32 in abutment with the web 46 and the reaction plate 48. The arrangement is such as to urge the reaction plate 48 axially to the right to engage the clutch and couple the shaft 32 to the shaft 24. The configuration of components when the clutch is engaged is illustrated in FIG. 1.

A housing cap 54 is retained within an opening 56 within the housing 10 by a spring retainer 58 and includes an axially extending cylindrical configuration 60 disposed about the shaft 32 and mounting a journal bearing 62. The journal bearing 62 journals the reaction plate 44. Thus, it will be appreciated that all rotating parts are suitably journalled by the bearings 14, 26, 30 and 62 whether the clutch be engaged or disengaged.

Since the Belleville springs 50 cause the clutch to be normally engaged, and no thrust bearings are employed in associating the various rotating components when the shafts 32 and 24 are coupled together, it will be appreciated that thrust bearings conventionally utilized for the purpose of compressing clutch packs have been eliminated so as to eliminate this source of premature failure of the clutch unit.

At the same time, means must be provided for disengaging the clutch.

As alluded to previously, the reaction plate 48 is bell or cup-shaped and includes an axially extending skirt 70 just radially outwardly of the fingers 42 on the reaction plate 44. The end 72 of the skirt is aligned with one race 74 of a thrust bearing 76. The thrust bearing 76 is shown as a ball bearing but the same could be a roller bearing if desired.

The thrust bearing 76 includes a second race 78 which is axially spaced from the race 74 and which includes an edge 80 that extends radially outwardly of the race 74.

A pair of Belleville springs 82 is interposed between the housing cap 54 and the race 78 and is compressed when the clutch is engaged as illustrated in FIG. 1 by means to be described. However, when not compressed, the Belleville springs 82 move to the position illustrated in FIG. 2 thereby axially shifting the thrust bearing 76 to the left against the end 72 of the skirt 70 of the reaction plate 48. This in turn forces the reaction plate 48 to the left against the bias of the Belleville springs 50. The clutch pack 34 is thus released from compression and the clutch disengages the shafts 24 and 32.

Needless to say, in order that such occurs, the Belleville springs 82 must supply a greater shifting force than the Belleville springs 50.

Figure 2:
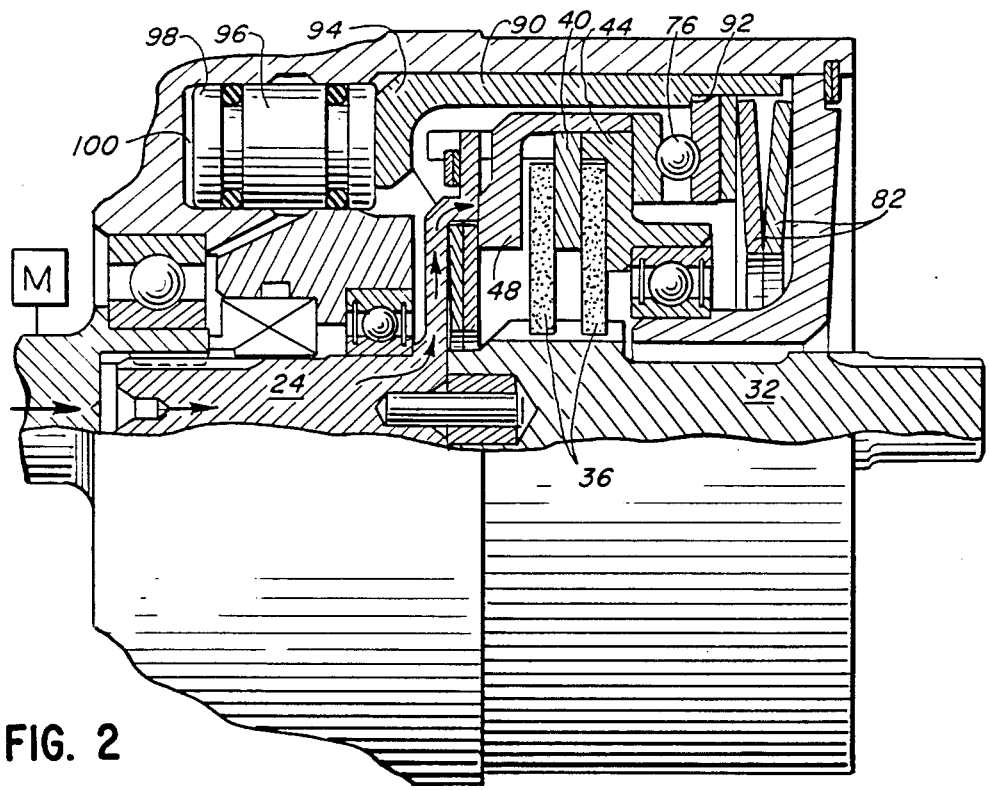
FIG. 2 is a view similar to FIG. 1 but showing the relative position of the components when the clutch is disengaged.

When the clutch is to be engaged, the Belleville springs 82 are compressed so that the Belleville springs 50 can compress the clutch pack. In order to achieve compression of the Belleville springs 82, the interior of the housing 10 is fitted with a cup-shaped actuator 90 which is axially movable and which includes a step 92 engaging the edge 80 of the race 78 of the thrust bearing 76. The base 94 of the actuator 90 is engaged by a plurality of equally angularly spaced pistons 96 (only one of which is shown) received within bores 98 within the housing 10 and connected in common so that the application of fluid under pressure to the side 100 of the pistons 96 will drive the actuator to the right as viewed in the drawings. When such occurs, by reason of the engagement of the step 92 with the edge 74, the thrust bearing 76 will be moved to the right to compress the Belleville springs 82 as illustrated in FIG. 1 and allow the clutch engage under the biasing influence of the Belleville washers 50. When pressure is released, the bias provided by the Belleville springs 82, in addition to disengaging the clutch, will shift the thrust bearing 76 to the left as best seen in FIG. 2 driving the actuator 90 to the left along with the piston 96.

If desired, a single donut-shaped annular piston could be utilized in lieu of a plurality of the pistons 96.

From the foregoing, it will be appreciated that when the clutch is engaged, there are no thrust bearings within the load path. When the thrust bearing 76 does become operative, it is only when the clutch is disengaged and consequently, the loading on the same is minimal, thereby prolonging its life.

One particular intended use of a clutch made according to the invention is in the actuation system for the horizontal stabilizers in aircraft. However, it is to be understood that the clutch construction is applicable to virtually any type of clutching system where long life is required. In this respect, it is noted that comparable capacity clutches utilized in similar environments employing thrust bearings for driving the reaction plates together to engage the clutch were such that the bearings would wear out about every 400 hours.

In contrast, with a clutch made according to the invention, a bearing life on the order of 4,000 hours is now expected. This expected 10 fold increase in bearing life is directly attributable to that feature of the invention which removes the thrust bearing from the load path when the clutch is engaged.

We claim:

1. A clutch comprising:

a housing;

a first shaft;

a second shaft coaxial with said first shaft;

a clutch pack comprising a plurality of relatively axially movable friction plates sandwiched by a first reaction plate and a second reaction plate, at least one of said friction plates being sandwiched by two other friction plates and mounted on one of said shafts for rotation therewith and said two other friction plates being mounted on the other of said shafts for rotation therewith;

said reaction plates being associated with one of said shafts for rotation therewith and being axially movable relative to each other to compress and release said friction plates;

a spring for moving said reaction plates toward each other;

a motor carried by said housing; and a thrust bearing movable by said motor between a first position non-engaged with said plates and a second position urging at least one of said reaction plates away from the other of said reaction plates.

2. The clutch of claim 1 wherein said motor comprises a further spring and a piston operable to compress said further spring, said further spring moving said thrust bearing toward said second position when not compressed by said piston.

3. The clutch of claim 2 wherein said shafts are in substantial end to end relation, a journal bearing on the end of one of said shafts and a pin carried by the other of said shafts and journalled in said journal bearing.

4. The clutch of claim 2 wherein said thrust bearing comprises a ball or roller bearing having two axially spaced races, one of said races having an edge extending radially outwardly of the other of said races; said further spring applying a bias to said one race; a cup shaped actuator about said clutch pack and axially movable within said housing, said actuator engaging said edge oppositely of said further spring and said piston engaging said actuator.

5. The clutch of claim 1 wherein said housing mounts first and second journal bearings in proximity to said shafts; one of said journal bearings journalling said first shaft and the other of said journal bearings journalling the reaction plate remote from said first shaft; and a third journal bearing carried by an end of one of said shafts and journalling the adjacent end of other of said shafts.

6. A clutch comprising:
a housing;
a first shaft;
a second shaft coaxial with said first shaft and journalling the same;
a clutch pack comprising a plurality of relatively axially movable friction plates sandwiched by a first reaction plate and a second reaction plate, at least one of said friction plates being sandwiched by two other friction plates and mounted on one of said shafts for rotation therewith and said two other friction plates being mounted on the other of said shafts for rotation therewith;
said reaction plates being associated with one of said shafts for rotation therewith and being axially movable relative to each other to compress and release said friction plates;
means for biasing said reaction plates toward each other;
a thrust bearing having axially spaced races movable between a first position non-engaged with said plates and a second position urging at least one of said reaction plates away from the other of said reaction plates; and
a motor connected to one of said races for moving said thrust bearing between said positions;
a first journal bearing journalling one of said shafts; and
a second journal bearing journalling the one of said reaction plates axially remote from said one shaft.

7. The clutch of claim 6 wherein said one race has an edge radially outwardly of the other face, and said motor operates against said edge.

8. The clutch of claim 6 wherein said biasing means comprises a first Belleville spring carried by said one shaft and said motor includes a second Belleville spring acting in opposition to said first Belleville spring through said thrust bearing.

9. A clutch comprising:
a housing;
a first shaft;
a second shaft coaxial with and journalling an end of said first shaft;
a clutch pack comprising a plurality of relatively axially movable friction plates sandwiched by a first reaction plate and a second reaction plate, at least one of said friction plates being sandwiched by two other friction plates and mounted on one of said shafts for rotation therewith and said two other friction plates being mounted on the other of said shafts for rotation therewith;
said reaction plates being associated with one of said shafts for rotation therewith and being axially movable relative to each other to compress and release said friction plates;
a first journal bearing journalling said one shaft;
a second journal bearing journalling one of said reaction plates;
a Belleville spring carried by said one shaft for moving said reaction plates toward each other;
a piston motor carried by said housing;
a thrust bearing movable by said piston motor between a first position non-engaged with said plates and a second position urging at least one of said reaction plates away from the other of said reaction plates in opposition to said Belleville spring; and
a second Belleville spring biasing said thrust bearing toward said second position;
said piston motor being selectively operable against said thrust bearing to overcome the bias of said second Belleville spring to simultaneously engage said clutch and remove said thrust bearing from the load path of the clutch.

* * * * *